(12) United States Patent
Lin

(10) Patent No.: US 11,309,934 B2
(45) Date of Patent: *Apr. 19, 2022

(54) METHOD AND APPARATUS FOR DETERMINING FREQUENCY HOPPING OF CHANNEL, AND COMPUTER STORAGE MEDIUM

(71) Applicant: Guangdong OPPO Mobile Telecommunications Corp., Ltd., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 19 days.

This patent is subject to a terminal disclaimer.

(21) Appl. No.: 16/802,460

(22) Filed: Feb. 26, 2020

(65) Prior Publication Data

US 2020/0195298 A1 Jun. 18, 2020

Related U.S. Application Data

(63) Continuation of application No. PCT/CN2018/083985, filed on Apr. 20, 2018.

(30) Foreign Application Priority Data

Sep. 8, 2017 (CN) .................. PCT/CN2017/101093

(51) Int. Cl.
*H04B 1/713* (2011.01)
*H04L 5/00* (2006.01)
(Continued)

(52) U.S. Cl.
CPC ........... *H04B 1/713* (2013.01); *H04L 5/0051* (2013.01); *H04L 5/0053* (2013.01);
(Continued)

(58) Field of Classification Search
CPC ..... H04B 1/713; H04B 1/7143; H04W 76/27; H04W 72/0453; H04W 74/004;
(Continued)

(56) References Cited

U.S. PATENT DOCUMENTS 9,628,140 B2 4/2017 Xie et al.
9,887,801 B2 2/2018 Papasakellariou
(Continued)

FOREIGN PATENT DOCUMENTS

CN 1604509 A 4/2005
CN 101030801 A 9/2007
(Continued)

OTHER PUBLICATIONS

MCC Support; "Final Report of 3GPP TSG RAN WG1 #90 V1.0.0" (Prague, Czech Rep, Aug. 21-25, 2017), 3GPP TSG RAN WG1 Meeting #90bis, R1-1716941, Prague, Czech Rep, Oct. 9-13, 2017.
(Continued)

*Primary Examiner* — Ajit Patel
*Assistant Examiner* — Wilfred Thomas
(74) *Attorney, Agent, or Firm* — Perkins Coie LLP

(57) ABSTRACT

The present invention discloses a method and an apparatus of determining frequency hopping for a channel, and a computer storage medium. The method includes: determining, by a terminal, a first bandwidth corresponding to a bandwidth part, where the first bandwidth corresponding to the bandwidth part is less than a second bandwidth corresponding to a system bandwidth; determining, by the terminal based on the first bandwidth corresponding to the bandwidth part, a frequency hopping step corresponding to an uplink channel; and determining, by the terminal based on the frequency hopping step corresponding to the uplink channel, a frequency domain position used for transmitting the uplink channel.

11 Claims, 8 Drawing Sheets

(51) Int. Cl.
*H04W 72/04* (2009.01)
*H04W 74/00* (2009.01)
*H04W 76/27* (2018.01)

(52) U.S. Cl.
CPC ....... *H04L 5/0064* (2013.01); *H04W 72/0453* (2013.01); *H04W 74/004* (2013.01); *H04W 76/27* (2018.02)

(58) Field of Classification Search
CPC ............. H04W 72/04; H04W 72/0413; H04W 72/1284; H04L 5/0051; H04L 5/0053; H04L 5/0064; H04L 5/0094; H04L 5/0012
See application file for complete search history.

(56) References Cited

U.S. PATENT DOCUMENTS

| | | | |
|---|---|---|---|
| 2010/0284363 | A1 | 11/2010 | Ahn |
| 2012/0263142 | A1 | 10/2012 | Ahn |
| 2012/0307744 | A1* | 12/2012 | Charbit ............... H04B 1/713 370/329 |
| 2014/0198745 | A1 | 7/2014 | Fei |
| 2014/0321510 | A1 | 10/2014 | Ahn et al. |
| 2016/0269939 | A1 | 9/2016 | Papasakellariou |
| 2016/0277065 | A1 | 9/2016 | Xie et al. |
| 2016/0345118 | A1 | 11/2016 | Oh |
| 2017/0134068 | A1 | 5/2017 | Ahn et al. |
| 2017/0238313 | A1* | 8/2017 | Wang ............... H04B 1/713 370/329 |
| 2017/0295005 | A1 | 10/2017 | Lee et al. |
| 2017/0346615 | A1* | 11/2017 | Liu ............... H04L 5/0012 |
| 2018/0159655 | A1 | 6/2018 | Papasakellariou |
| 2018/0159656 | A1 | 6/2018 | Papasakellariou |
| 2020/0022127 | A1* | 1/2020 | Li ............... H04L 5/0037 |
| 2020/0059390 | A1 | 2/2020 | Zhang et al. |
| 2020/0120642 | A1 | 4/2020 | Hwang et al. |
| 2020/0344761 | A1 | 10/2020 | Amuru et al. |

FOREIGN PATENT DOCUMENTS

| | | |
|---|---|---|
| CN | 101400065 A | 4/2009 |
| CN | 101815325 A | 8/2010 |
| CN | 101816133 A | 8/2010 |
| CN | 102781110 A | 11/2012 |
| CN | 103517344 A | 1/2014 |
| CN | 104283581 A | 1/2015 |
| CN | 106160988 A | 11/2016 |
| CN | 106464296 A | 2/2017 |
| KR | 20170042695 A | 4/2017 |
| RU | 2531386 C2 | 10/2014 |
| WO | 2016025836 A1 | 12/2016 |

OTHER PUBLICATIONS

Written Opinion of the International Search Authority in the international application No. PCT/CN2018/083985, dated Jul. 20, 2018.
Written Opinion of the International Search Authority in the international application No. PCT/CN2018/097114, dated Sep. 27, 2018.
Written Opinion of the International Search Authority in the international application No. PCT/CN2017/101093, dated Nov. 29, 2017.
International Patent Application No. PCT/CN2017/101093, "International search report" dated Nov. 29, 2017.
International Patent Application No. PCT/CN2018/083985, "International search report", dated Jul. 20, 2018.
International Patent Application No. PCT/CN2018/097114, "International search report", dated Sep. 27, 2018.
Samsung, R1-1710702, "Bandwidth Part Hopping for CORESETS", 3GPP TSG RAN WG1 NR ad-Hoc#2, Qindao, China, Jun. 17, 2017.
Samsung, R1-1710718, "DL/UL Frequency Resource Allocation", 3GPP TSG RAN WG1 Meeting NR Ad-Hoc, Qingdao, China, Jun. 17, 2017.
KT Corp., R1-1714475, "Considerations on frequency hopping for PUCCH", 3GPP TSG RAN WG1 Meeting #90, Prague, Czech Republic, Aug. 25, 2017.
Samsung, R1-1713621, "Bandwidth Part Hopping for CORESETS", 3GPP TSG RAN WG1 #90, Prague, Czech Republic, Aug. 25, 2017.
First Office Action of the Chinese application No. 202010087344.6, dated Mar. 31, 2021.
European Application No. 18854548.7, European Search Report dated Jul. 27, 2020.
R2-1702318 Apple Intelqualcomm,Etc, Signaling support for CE mode and bandwidth switch for FeMTC devices Feb. 13-17, 2017.
R1-1710782 CMCC Discussion on subband-based PUCCH resource allocation and indication Jun. 27-30, 2017.
R2-1706427 Samsung, RAN2 consideration for bandwidth part in NR Jun. 27-29, 2017.
R1-1712402 CATT Design of 2-symbol short PUCCHformat Aug. 21-25, 2017.
R1-1712870 VIVO Discussion on the activation/deactivation of the bandwidth part Aug. 21-25, 2017.
European Application No. 18853277.4, European Search Report dated Jul. 27, 2020.
Notice of Allowance of the Chinese application No. 202010107956.7, dated Aug. 25, 2021. 6 pages with English translation.
Notice of Allowance of the U.S. Appl. No. 16/776,186, dated Sep. 23, 2021. 15 pages.
Office Action of the Indian application No. 202017014767, dated Sep. 23, 2021. 8 pages with English translation.
Office Action of the Indian application No. 202017014770, dated May 22, 2021. 7 pages with English translation.
Office Action of the Taiwanese application No. 107131637, dated Sep. 30, 2021. 11 pages with English translation.
Office Action of the Taiwanese application No. 107131634, dated Sep. 30, 2021. 10 pages with English translation.
First Office Action of the Chinese application No. 202010107956.7, dated Apr. 21, 2021.
First Office Action of the U.S. Appl. No. 16/776,186, dated Jun. 29, 2021.
First Office Action of the Canadian application No. 3074337, dated Apr. 20, 2021.
First Office Action of the European application No. 18853277.4, dated Apr. 30, 2021.
First Office Action of the European application No. 18854548.7, dated May 6, 2021.
Written Opinion of the Singaporean application No. 11202001883V, dated Oct. 22, 2021. 9 pages.
First Office Action of the Russian application No. 2020112737, dated Nov. 9, 2021. 13 pages with English translation.
3GPP TSG RAN WG1 Meeting #90 R1-1713266, Guangdong OPPO Mobile Telecom, "Remaining issues on bandwidth part configuration and activation", Prague, Czech Republic, Aug. 21-25, 2017. 6 pages.
First Office Action of the Japanese application No. 2020-513921, dated Feb. 25, 2022. 12 pages with English translation.

* cited by examiner

METHOD AND APPARATUS FOR DETERMINING FREQUENCY HOPPING OF CHANNEL, AND COMPUTER STORAGE MEDIUM

CROSS-REFERENCES TO RELATED APPLICATIONS

This application is a continuation of and claims priority to International Patent Application PCT/CN2018/083985, filed on Apr. 20, 2018, which claims priority to International Patent Application PCT/CN2017/101093, filed on Sep. 8, 2017, the contents of which are hereby incorporated by reference in their entirety.

BACKGROUND OF THE INVENTION

Technical Field

The present invention relates to frequency hopping technologies in the mobile communications field, and in particular, to a method and an apparatus of determining frequency hopping for a channel, and a computer storage medium.

Related Art

In a long term evolution (LTE, Long Term Evolution) system, a frequency hopping technology may be used for a physical uplink control channel (PUCCH, Physical Uplink Control Channel) to obtain a frequency domain diversity gain and to improve channel transmission performance. In LTE, the first step and the second step of PUCCH frequency hopping are symmetrical about a central axis in system bandwidth. As shown in FIG. 1, a distance between the first step and a lower edge of the system bandwidth is kept consistent with a distance D between the second step and an upper edge of the system bandwidth, where both distances are D.

In the foregoing design for the PUCCH frequency hopping, PUCCHs may be distributed on two sides of the system bandwidth, so that a central part of the system bandwidth is left to a data channel, such as a physical uplink shared channel (PUSCH, Physical Uplink Shared Channel), but this causes PUCCH frequency hopping steps of different terminals to be different. As shown in FIG. 2, for some terminals, frequency hopping steps are larger, and PUCCHs are closer to an edge of the system bandwidth, a frequency domain diversity effect is better, and transmission performance is better; and for some other terminals, frequency hopping steps are smaller, PUCCHs are closer to a center of the system bandwidth, a frequency domain diversity effect is poorer, and transmission performance is worse. It can be seen that a conventional design for the PUCCH frequency hopping causes an unstable frequency hopping step, leading to the decline of transmission performance of the PUCCH of part of terminals when a capacity of the PUCCH is relatively large.

SUMMARY OF THE INVENTION

To resolve the foregoing technical problem, embodiments of the present invention provide a method and an apparatus of determining frequency hopping for a channel, and a computer storage medium.

A method of determining frequency hopping for a channel provided according to an embodiment of the present invention includes: determining, by a terminal, a first bandwidth corresponding to a bandwidth part, where the first bandwidth corresponding to the bandwidth part is less than a second bandwidth corresponding to a system bandwidth; determining, by the terminal based on the first bandwidth corresponding to the bandwidth part, a frequency hopping step corresponding to an uplink channel; and determining, by the terminal based on the frequency hopping step corresponding to the uplink channel, a frequency domain position used for transmitting the uplink channel.

In an embodiment of the present invention, the determining, by a terminal, a first bandwidth corresponding to a bandwidth part includes: receiving, by the terminal, first configuration information, and determining, based on the first configuration information, the first bandwidth corresponding to the bandwidth part.

In an embodiment of the present invention, the receiving, by the terminal, first configuration information includes: receiving, by the terminal, radio resource control (RRC, Radio Resource Control) signaling that carries the first configuration information; or receiving, by the terminal, system information carrying the first configuration information.

In an embodiment of the present invention, the receiving, by the terminal, first configuration information, and determining, based on the first configuration information, the first bandwidth corresponding to the bandwidth part includes: determining, by the terminal based on one piece of first configuration information when receiving the one piece of first configuration information, the first bandwidth corresponding to the bandwidth part; and determining, by the terminal based on a plurality of pieces of first configuration information when receiving the plurality of pieces of first configuration information, a plurality of candidate first bandwidths corresponding to the bandwidth part; and selecting, from the plurality of candidate first bandwidths, the first bandwidth corresponding to the bandwidth part.

In an embodiment of the present invention, the selecting, from the plurality of candidate first bandwidths, the first bandwidth corresponding to the bandwidth part includes: receiving, by the terminal, first control signaling, and selecting, from the plurality of candidate first bandwidths based on the first control signaling, the first bandwidth corresponding to the bandwidth part.

In an embodiment of the present invention, the first control signaling is: downlink control information (DCI, Downlink Control Information) or a media access control control element (MAC CE, Media Access Control Control Element).

In an embodiment of the present invention, the determining, by the terminal based on the first bandwidth corresponding to the bandwidth part, a frequency hopping step corresponding to an uplink channel includes: determining, by the terminal based on the following formula, the frequency hopping step corresponding to the uplink channel: $W_H = nW$, where $W_H$ is the frequency hopping step corresponding to the uplink channel, W is the first bandwidth corresponding to the bandwidth part, n is a proportionality coefficient, $n = 1/m$, and m is a positive integer greater than 1.

When WH is determined based on the formula $W_H = nW$, $W_H = \lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step has an actual meaning only when being equal to an integer multiple of a frequency domain scheduling unit, in this embodiment of the present invention, a value of $W_H$ is an integer.

In an embodiment of the present invention, the method further includes: determining, by the terminal, n or $W_H$ based on a preset value; or receiving, by the terminal, second configuration information, and determining n or $W_H$ based on the second configuration information.

In an embodiment of the present invention, the receiving, by the terminal, second configuration information includes: receiving, by the terminal, RRC signaling that carries the second configuration information; or receiving, by the terminal, system information carrying the second configuration information.

In an embodiment of the present invention, the second configuration information and the first configuration information are same configuration information.

In an embodiment of the present invention, the receiving, by the terminal, second configuration information, and determining n or $W_H$ based on the second configuration information includes: determining, by the terminal, n or $W_H$ based on one piece of second configuration information when receiving the one piece of second configuration information; and determining, by the terminal, a plurality of candidate n or $W_H$ based on a plurality of pieces of second configuration information when receiving the plurality of pieces of second configuration information; and selecting n or $W_H$ from the plurality of candidate n or $W_H$.

In an embodiment of the present invention, the selecting n or $W_H$ from the plurality of candidate n or $W_H$ includes: receiving, by the terminal, second control signaling, and selecting n or $W_H$ from the plurality of candidate n or $W_H$ based on the second control signaling.

In an embodiment of the present invention, the second control signaling is: DCI or a MAC CE.

In an embodiment of the present invention, the second control signaling and the first control signaling are same control signaling.

In an embodiment of the present invention, the determining, by the terminal based on the frequency hopping step corresponding to the uplink channel, a frequency domain position used for transmitting the uplink channel includes: determining, by the terminal, a frequency domain position of the second step of frequency hopping based on a frequency domain position of the first step of frequency hopping and the frequency hopping step corresponding to the uplink channel, where the frequency domain position of the first step of frequency hopping and the frequency domain position of the second step of frequency hopping are frequency domain positions used for transmitting the uplink channel.

In an embodiment of the present invention, the method further includes: receiving, by the terminal, third control signaling, and determining the frequency domain position of the first step of frequency hopping based on the third control signaling.

In an embodiment of the present invention, the third control signaling is: DCI or a MAC CE.

In an embodiment of the present invention, the third control signaling and at least one of the following are same control signaling: the first control signaling and the second control signaling.

An apparatus of determining frequency hopping for a channel provided according to an embodiment of the present invention includes: a first determining unit, configured to determine a first bandwidth corresponding to a bandwidth part, where the first bandwidth corresponding to the bandwidth part is less than a second bandwidth corresponding to a system bandwidth; a second determining unit, configured to determine, based on the first bandwidth corresponding to the bandwidth part, a frequency hopping step corresponding to an uplink channel; and a third determining unit, configured to determine, based on the frequency hopping step corresponding to the uplink channel, a frequency domain position used for transmitting the uplink channel.

In an embodiment of the present invention, the first determining unit includes: a first receiving subunit, configured to receive first configuration information; and a first determining subunit, configured to determine, based on the first configuration information, the first bandwidth corresponding to the bandwidth part.

In an embodiment of the present invention, the first receiving subunit is specifically configured to receive RRC signaling that carries the first configuration information; or receive system information carrying the first configuration information.

In an embodiment of the present invention, the first determining subunit is specifically configured to: determine, based on one piece of first configuration information when the one piece of first configuration information is received, the first bandwidth corresponding to the bandwidth part; determine, based on a plurality of pieces of first configuration information when the plurality of pieces of first configuration information is received, a plurality of candidate first bandwidths corresponding to the bandwidth part; and select, from the plurality of candidate first bandwidths, the first bandwidth corresponding to the bandwidth part.

In an embodiment of the present invention, the first determining unit further includes: a second receiving subunit, configured to receive first control signaling; and the first determining subunit is further configured to select, from the plurality of candidate first bandwidths based on the first control signaling, the first bandwidth corresponding to the bandwidth part.

In an embodiment of the present invention, the first control signaling is: DCI or a MAC CE.

In an embodiment of the present invention, the second determining unit is specifically configured to determine, based on the following formula, the frequency hopping step corresponding to the uplink channel: $W_H=nW$, where $W_H$ is the frequency hopping step corresponding to the uplink channel, W is the first bandwidth corresponding to the bandwidth part, n is a proportionality coefficient, n=1/m, and m is a positive integer greater than 1.

When $W_H$ is determined based on the formula $W_H=nW$, $W_H=\lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step has an actual meaning only when being equal to an integer multiple of a frequency domain scheduling unit, in this embodiment of the present invention, a value of $W_H$ is an integer.

In an embodiment of the present invention, the second determining unit includes: a second determining subunit, configured to determine n or $W_H$ based on a preset value; or a third receiving subunit, configured to receive second configuration information; and a second determining subunit, configured to determine n or $W_H$ based on the second configuration information.

In an embodiment of the present invention, the third receiving subunit is specifically configured to receive RRC signaling that carries the second configuration information; or receive system information carrying the second configuration information.

In an embodiment of the present invention, the second configuration information and the first configuration information are same configuration information.

In an embodiment of the present invention, the second determining subunit is specifically configured to: determine n or $W_H$ based on one piece of second configuration information when the one piece of second configuration information is received; determine a plurality of candidate n or $W_H$ based on a plurality of pieces of second configuration information when the plurality of pieces of second configuration information is received; and select n or $W_H$ from the plurality of candidate n or $W_H$.

In an embodiment of the present invention, the second determining unit further includes: a fourth receiving subunit, configured to receive second control signaling; and the second determining subunit is further configured to select n or $W_H$ from the plurality of candidate n or $W_H$ based on the second control signaling.

In an embodiment of the present invention, the second control signaling is: DCI or a MAC CE.

In an embodiment of the present invention, the second control signaling and the first control signaling are same control signaling.

In an embodiment of the present invention, the third determining unit is specifically configured to determine a frequency domain position of the second step of frequency hopping based on a frequency domain position of the first step of frequency hopping and the frequency hopping step corresponding to the uplink channel, where the frequency domain position of the first step of frequency hopping and the frequency domain position of the second step of frequency hopping are frequency domain positions used for transmitting the uplink channel.

In an embodiment of the present invention, the third determining unit includes: a fifth receiving subunit, configured to receive third control signaling; and a third determining subunit, configured to determine the frequency domain position of the first step of frequency hopping based on the third control signaling.

In an embodiment of the present invention, the third control signaling is: DCI or a MAC CE.

In an embodiment of the present invention, the third control signaling and at least one of the following are same control signaling: the first control signaling and the second control signaling.

A computer storage medium provided according to an embodiment of the present invention stores a computer executable instruction. The computer executable instruction is executed by a processor to implement the foregoing channel frequency hopping determining method.

In the technical solutions of the embodiments of the present invention, the terminal determines the first bandwidth corresponding to the bandwidth part, where the first bandwidth corresponding to the bandwidth part is less than the second bandwidth corresponding to the system bandwidth; the terminal determines, based on the first bandwidth corresponding to the bandwidth part, the frequency hopping step corresponding to the uplink channel; and the terminal determines, based on the frequency hopping step corresponding to the uplink channel, the frequency domain position used for transmitting the uplink channel. When the technical solutions of the embodiments of the present invention are used, a stable frequency hopping step is implemented when the bandwidth value of the bandwidth part is given, thereby obtaining a more stable frequency domain diversity gain, and improving uplink channel (particularly uplink control channel) transmission performance.

BRIEF DESCRIPTION OF THE DRAWINGS

The accompanying drawings described herein are used for providing further understanding for the present invention and constitute a part of the present invention. Examples of embodiments of the present invention and descriptions thereof are used for explaining the present invention and do not constitute an improper limitation to the present invention. In the figures.

DETAILED DESCRIPTION OF THE INVENTION

To enable characteristics and technical content of embodiments of the present invention to be understood in a more detailed manner, the following describes implementation of the embodiments of the present invention in detail with reference to the accompanying drawings. The appended accompanying drawings are only for reference and description, and are not used to limit the embodiments of the present invention.

The 5th generation (5G NR) system is a direction of future mobile communications system research. In the 5G NR system, on one hand, to increase flexibility of frequency domain resource allocation, and reduce terminal power consumption, a 5G NR terminal may transmit a signal in a bandwidth part (Bandwidth Part) less than system bandwidth. When bandwidth of the bandwidth part is relatively small, a frequency hopping step of a central PUCCH is further reduced, affecting PUCCH transmission performance. On the other hand, a series of new technologies, such as a new-type multiple-input multiple-output (MIMO, Multiple-Input Multiple-Output) technology, are introduced into 5G NR, a larger quantity of channel state information reports (CSI report) are needed, and PUCCH load is increased by a big margin. Consequently, this causes a PUCCH to occupy a larger proportion of frequency domain resources in the bandwidth part, a frequency hopping step of a PUCCH close to a center of the bandwidth part becomes smaller, and the transmission performance further deteriorates.

Therefore, an embodiment of the present invention provides a channel frequency hopping determining method, to implement a stable frequency hopping step when a bandwidth value of the bandwidth part is given, thereby obtaining a more stable frequency domain diversity gain, and improving uplink channel (particularly uplink control channel) transmission performance.

Figure 1:
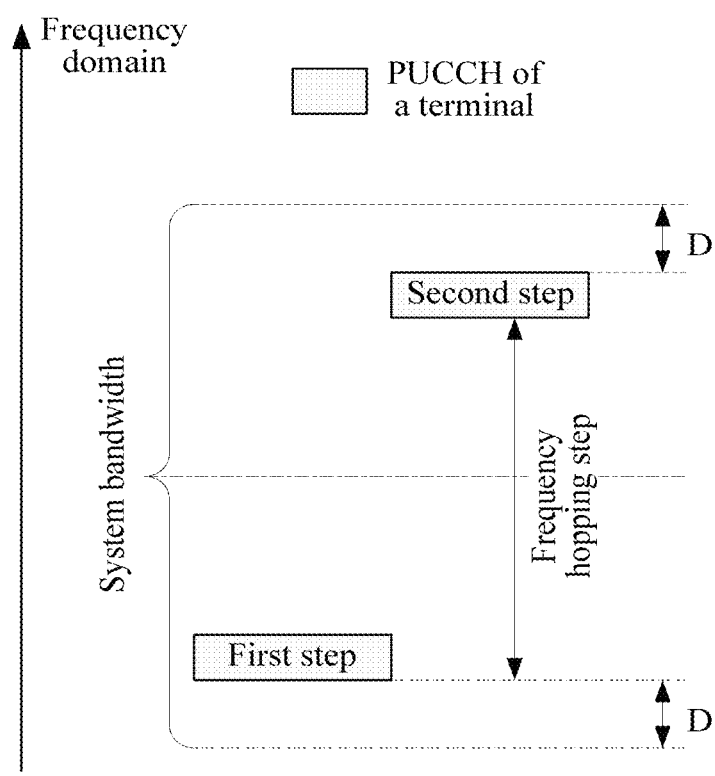
FIG. 1 is a schematic diagram 1 of an existing PUCCH frequency domain structure.
Figure 2:
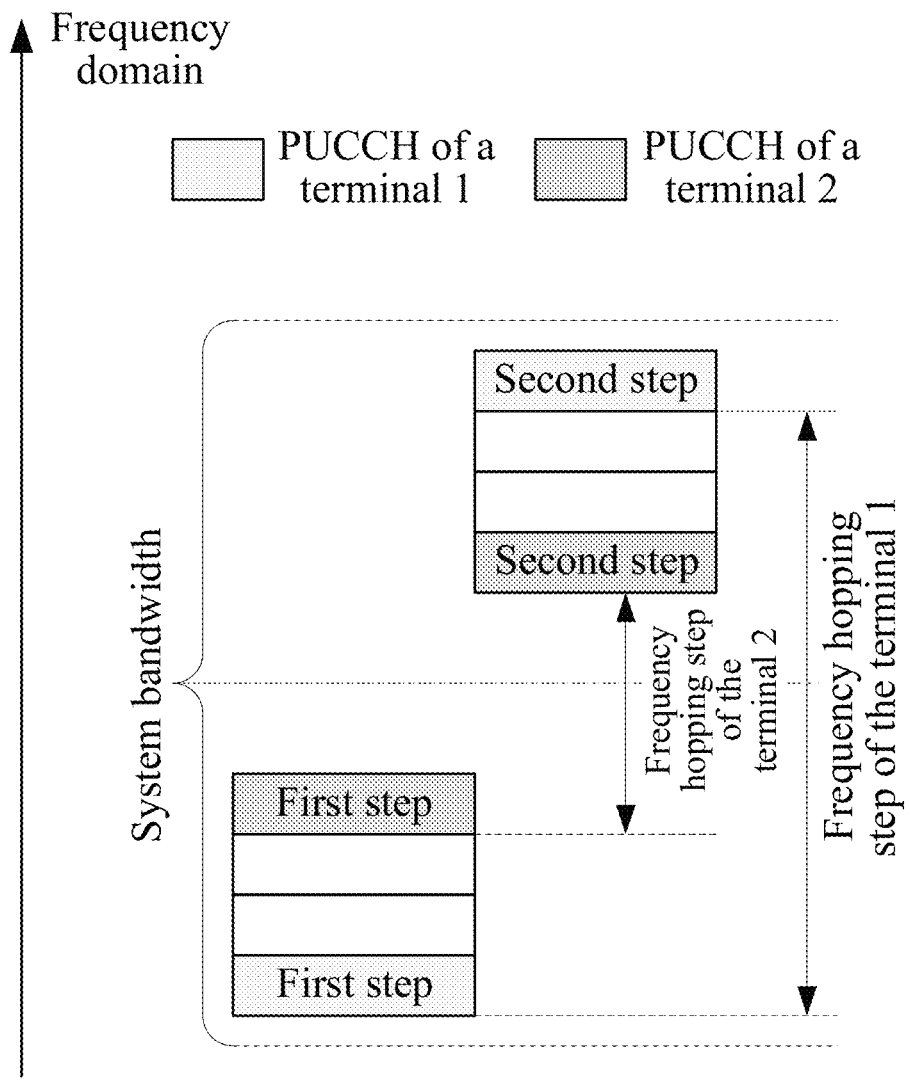
FIG. 2 is a schematic diagram 2 of an existing PUCCH frequency domain structure.
Figure 3:
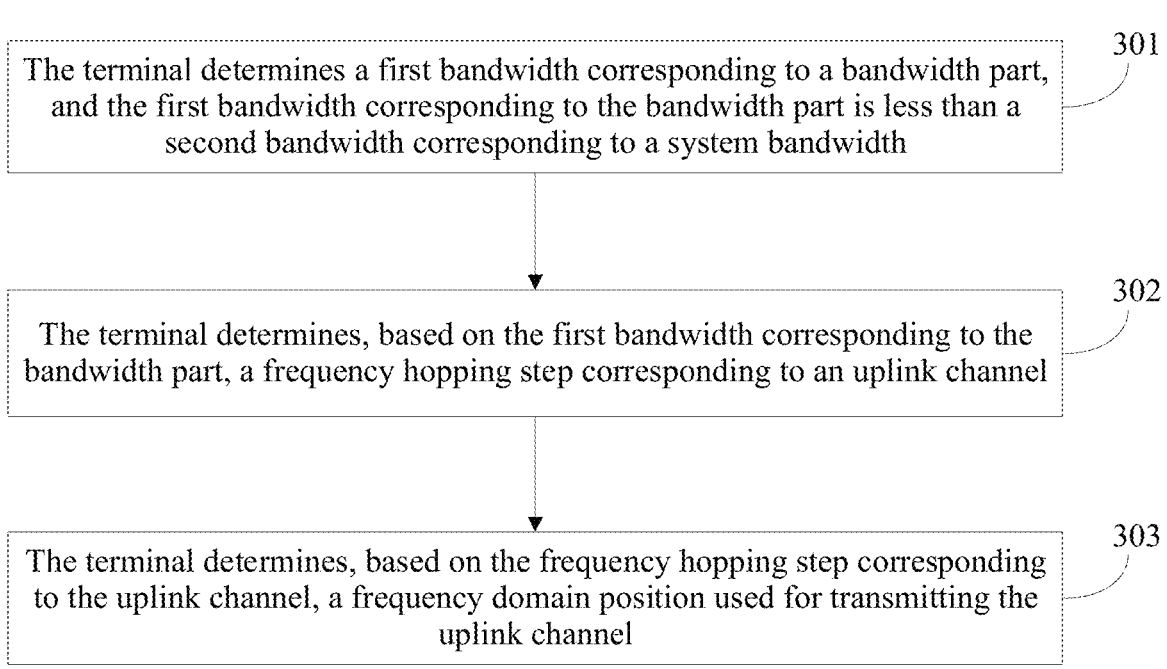
FIG. 3 is a schematic flowchart of a method of determining frequency hopping for a channel according to an embodiment of the present invention.

FIG. 3 is a schematic flowchart of a method of determining frequency hopping for a channel according to an embodiment of the present invention. As shown in FIG. 3, the method of determining frequency hopping for a channel includes the following steps.

Step 301: A terminal determines a first bandwidth corresponding to a bandwidth part, where the first bandwidth corresponding to the bandwidth part is less than a second bandwidth corresponding to a system bandwidth.

In this embodiment of the present invention, a type of the terminal is not limited. The terminal may be any type, such as a mobile phone, a notebook computer, a tablet computer, a desktop computer, an in-vehicle terminal, or a smart home terminal.

In this embodiment of the present invention, a bandwidth supported by a base station is referred to as a system bandwidth, that is, the second bandwidth. In LTE, the terminal may transmit a signal in an entire system bandwidth range. In a 5G NR system, the terminal transmits a signal only in a part of the system bandwidth. Herein, the part of the system bandwidth is referred to as the bandwidth part. Resource utilization efficiency of the system bandwidth can be effectively improved by using the bandwidth part.

In this embodiment of the present invention, an uplink channel may be transmitted in a frequency hopping manner. Using an example in which frequency hopping includes two steps, a difference in frequency domain between the first step of frequency hopping and the second step of frequency hopping is a frequency hopping step. A size of the frequency hopping step determines a frequency domain diversity gain of the uplink channel. A larger frequency hopping step indicates a larger frequency domain diversity gain of the uplink channel. On the contrary, a smaller frequency hopping step indicates a smaller frequency domain diversity gain of the uplink channel. To obtain a stable and relatively large frequency domain diversity gain, in this embodiment of the present invention, the frequency hopping step corresponding to the uplink channel is determined based on the first bandwidth corresponding to the bandwidth part, to improve uplink channel (particularly uplink control channel) transmission performance.

Specifically, the terminal needs to first determine the first bandwidth corresponding to the bandwidth part. Apparently, the first bandwidth corresponding to the bandwidth part is less than the second bandwidth corresponding to the system bandwidth.

In an embodiment of the present invention, the terminal receives first configuration information, and determines, based on the first configuration information, the first bandwidth corresponding to the bandwidth part.

Herein, that the terminal receives first configuration information may be implemented in the following two manners:

Manner 1: The terminal receives RRC signaling that carries the first configuration information.

Manner 2: The terminal receives system information carrying the first configuration information.

In the foregoing solution, the terminal may receive one or more pieces of first configuration information. Herein, a meaning of more is being greater than or equal to two.

The terminal determines, based on one piece of first configuration information when receiving the one piece of first configuration information, the first bandwidth corresponding to the bandwidth part.

The terminal determines, based on a plurality of pieces of first configuration information when receiving the plurality of pieces of first configuration information, a plurality of candidate first bandwidths corresponding to the bandwidth part; and selecting, from the plurality of candidate first bandwidths, the first bandwidth corresponding to the bandwidth part.

Herein, the terminal receives first control signaling, and selects, from the plurality of candidate first bandwidths based on the first control signaling, the first bandwidth corresponding to the bandwidth part. The first control signaling is: DCI or a MAC CE.

Step 302: The terminal determines, based on the first bandwidth corresponding to the bandwidth part, a frequency hopping step corresponding to an uplink channel.

In this embodiment of the present invention, the terminal determines, based on the following formula, the frequency hopping step corresponding to the uplink channel: $W_H = nW$, where $W_H$ is the frequency hopping step corresponding to the uplink channel, W is the first bandwidth corresponding to the bandwidth part, n is a proportionality coefficient, $n=1/m$, and m is a positive integer greater than 1.

When $W_H$ is determined based on the formula $W_H=nW$, $W_H=\lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step has an actual meaning only when being equal to an integer multiple of a frequency domain scheduling unit, in this embodiment of the present invention, a value of $W_H$ is an integer.

For example, n may be ½, ¼, or the like, and different terminals may correspond to a same n value, or different terminals correspond to different n values.

In the foregoing solution, the terminal needs to first determine n or $W_H$. Specifically, the terminal determines n or $W_H$ based on a preset value; or the terminal receives second configuration information, and determines n or $W_H$ based on the second configuration information.

Herein, that the terminal receives second configuration information may be implemented in the following two manners:

Manner 1: The terminal receives RRC signaling that carries the second configuration information.

Manner 2: The terminal receives system information carrying the second configuration information.

In an implementation of the present invention, the second configuration information and the first configuration information are same configuration information.

In the foregoing solution, the terminal may receive one or more pieces of second configuration information.

The terminal determines n or $W_H$ based on one piece of second configuration information when receiving the one piece of second configuration information.

The terminal determines a plurality of candidate n or $W_H$ based on a plurality of pieces of second configuration information when receiving the plurality of pieces of second configuration information; and selects n or $W_H$ from the plurality of candidate n or $W_H$.

Herein, the terminal receives second control signaling, and selects n or $W_H$ from the plurality of candidate n or $W_H$ based on the second control signaling. The second control signaling is: DCI or a MAC CE.

In an implementation of the present invention, the second control signaling and the first control signaling are same control signaling.

Step 303: The terminal determines, based on the frequency hopping step corresponding to the uplink channel, a frequency domain position used for transmitting the uplink channel.

In this embodiment of the present invention, the terminal determines a frequency domain position of the second step of frequency hopping based on a frequency domain position of the first step of frequency hopping and the frequency hopping step corresponding to the uplink channel, where the frequency domain position of the first step of frequency hopping and the frequency domain position of the second step of frequency hopping are frequency domain positions used for transmitting the uplink channel.

Herein, the terminal receives third control signaling, and determines the frequency domain position of the first step of frequency hopping based on the third control signaling. The third control signaling is: DCI or a MAC CE.

In an embodiment of the present invention, the third control signaling and at least one of the following are same control signaling: the first control signaling and the second control signaling.

The following further describes the technical solutions in the embodiments of the present invention in detail with reference to specific application examples.

Application Example 1

In this example, for a PUCCH frequency domain, a uniform frequency hopping step is used in one bandwidth part.

Figure 4:
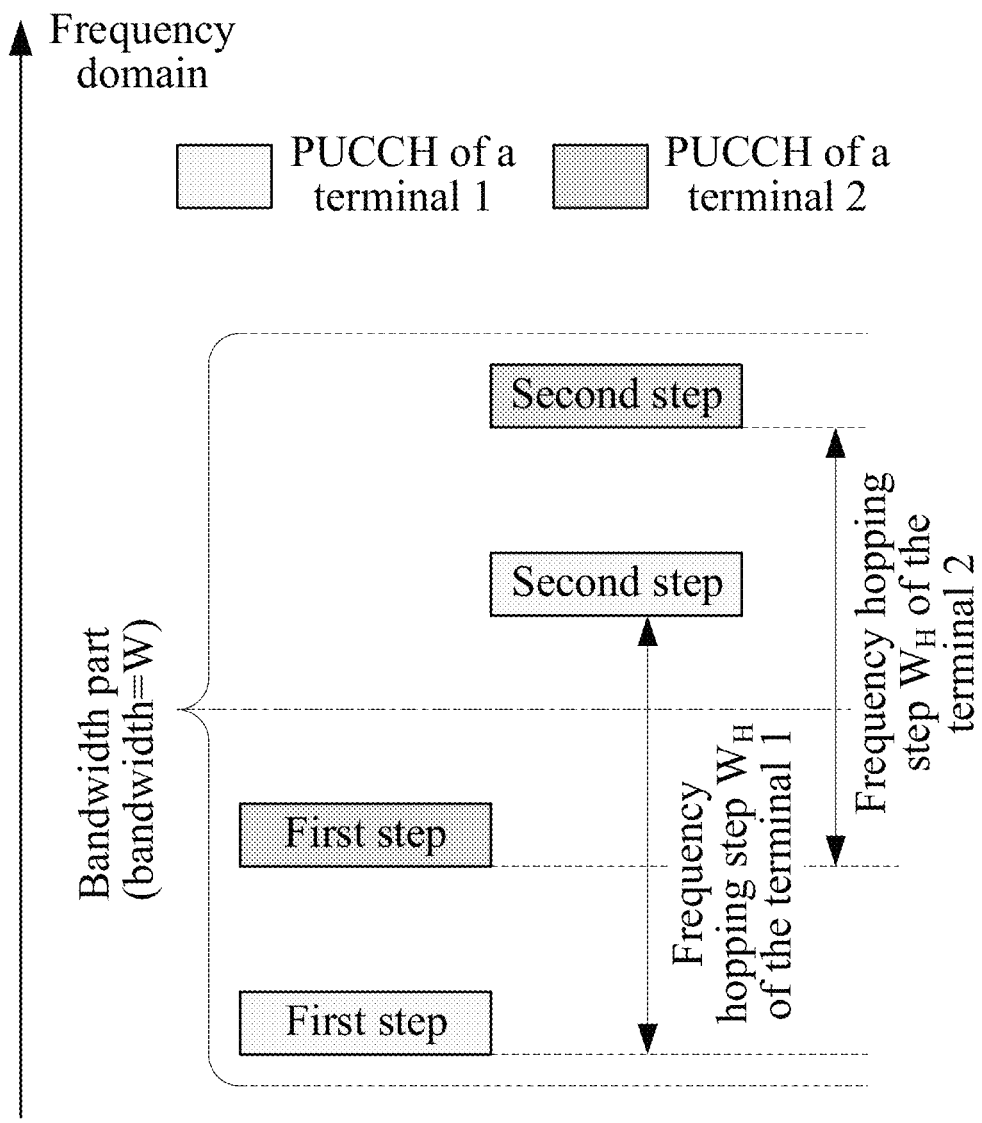
FIG. 4 is a schematic diagram 1 of a PUCCH frequency domain structure according to an embodiment of the present invention.

FIG. 4 is a schematic diagram 1 of a PUCCH frequency domain structure according to an embodiment of the present invention. As shown in FIG. 4, a bandwidth value of a bandwidth part or a type of bandwidth part is W, and a frequency hopping step $W_H$ in the PUCCH frequency domain corresponds to the bandwidth value W of the bandwidth part. For example, $W_H=W/2$.

In an implementation, a plurality of terminals using a same bandwidth part uses same $W_H$. For example, a bandwidth value of a bandwidth part 1 is W1, and a bandwidth value of a bandwidth part 2 is W2. In this case, a plurality of terminals in the bandwidth part 1 uses same $W_H=W1/2$, and a plurality of terminals in the bandwidth part 2 uses same $W_H=W2/2$.

In another implementation, a plurality of terminals using bandwidth parts of a same value uses same $W_H$. For example, bandwidth values of the bandwidth part 1 and the bandwidth part 2 are both W. In this case, a plurality of terminals in bandwidth part 1 and the bandwidth part 2 all uses same $W_H=W/2$.

Application Example 2

In this example, for a PUCCH frequency domain, a plurality of frequency hopping steps is used in one bandwidth part.

Figure 5:
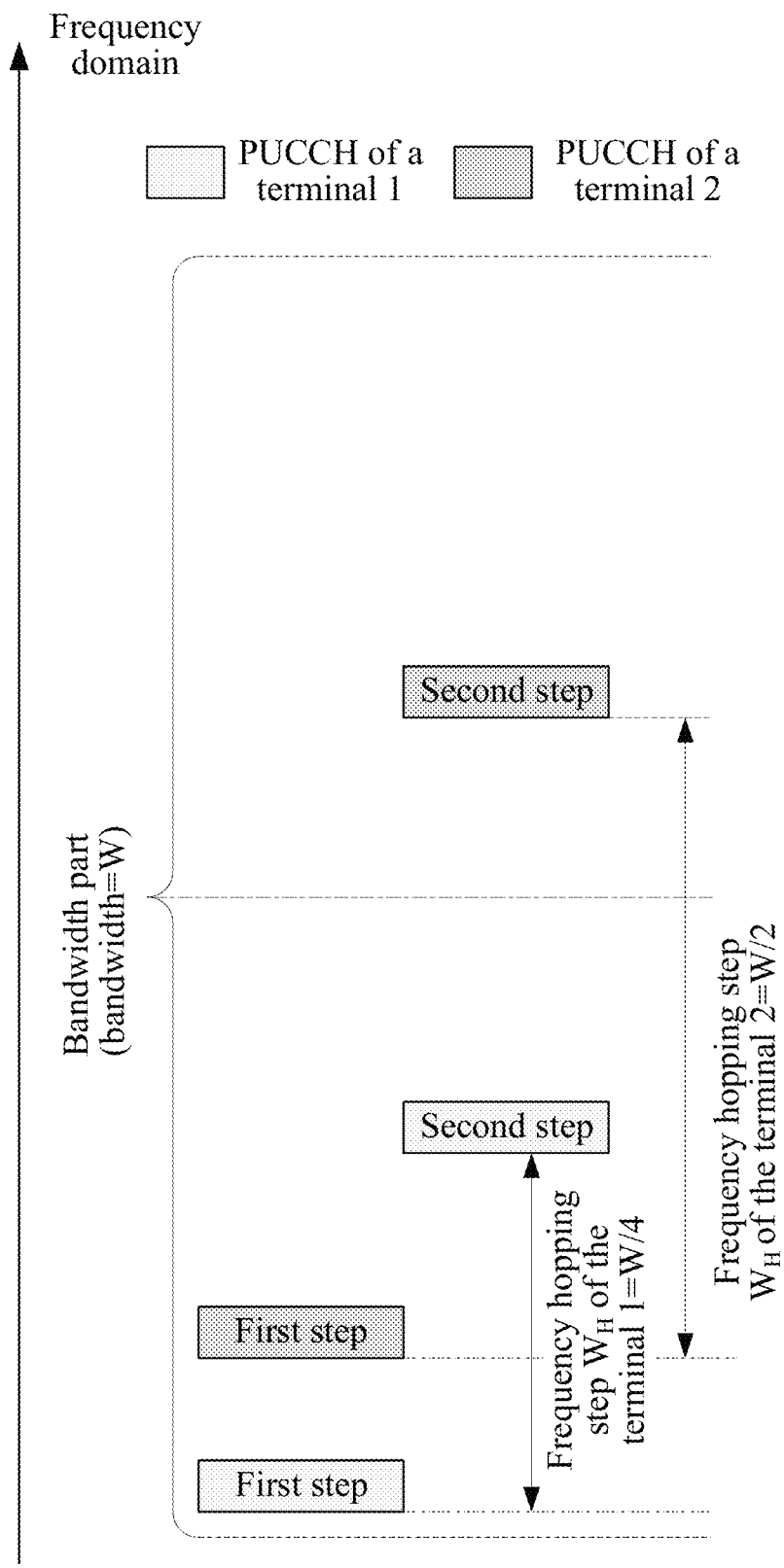
FIG. 5 is a schematic diagram 2 of a PUCCH frequency domain structure according to an embodiment of the present invention.

FIG. 5 is a schematic diagram 2 of a PUCCH frequency domain structure according to an embodiment of the present invention. As shown in FIG. 5, a bandwidth value of a bandwidth part or a type of bandwidth part is W, and a frequency hopping step $W_H$ in the PUCCH frequency domain corresponds to the bandwidth value W of the bandwidth part. A plurality of terminals using a same bandwidth part or bandwidth parts of a same value may use different $W_H$ configurations. For example, $W_H$ of a terminal 1=W/4, and $W_H$ of a terminal 2=W/2. In other words, the terminal 1 and the terminal 2 use different n configurations, that is, n of the terminal 1=4, and n of the terminal 2=2.

Figure 6:
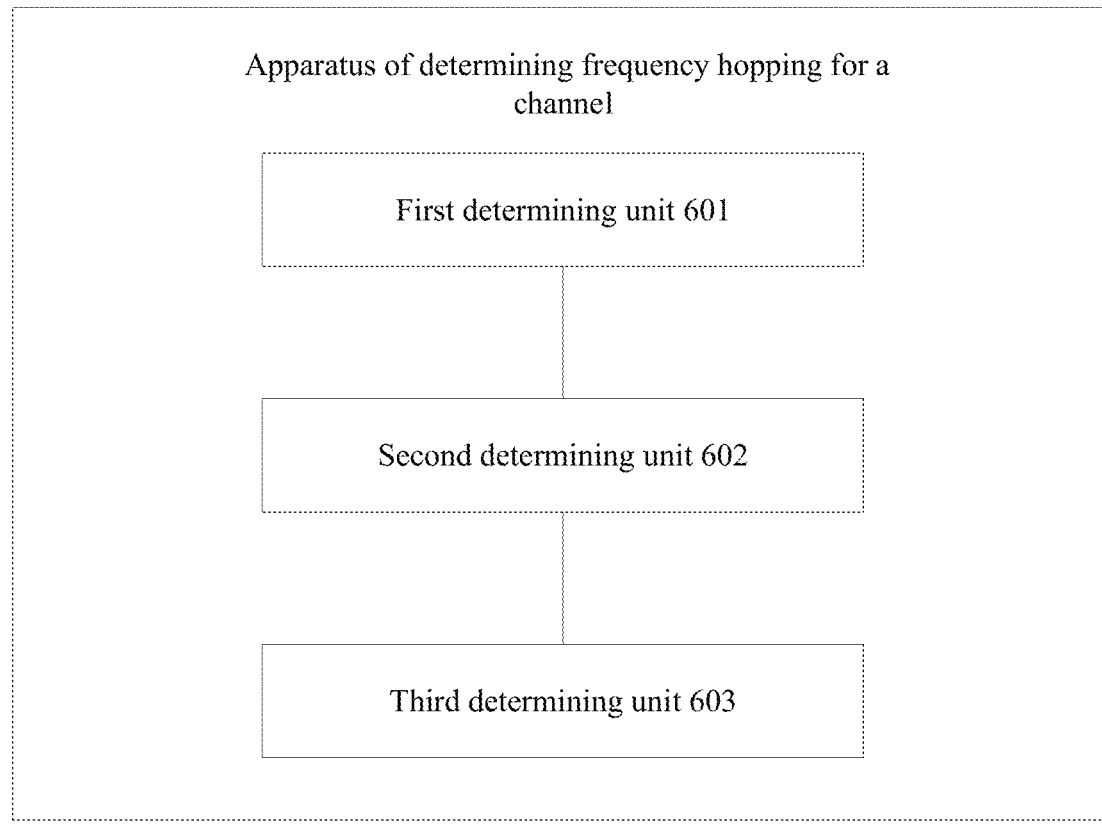
FIG. 6 is a schematic structural composition diagram 1 of an apparatus of determining frequency hopping for a channel according to an embodiment of the present invention.

FIG. 6 is a schematic structural composition diagram 1 of an apparatus of determining frequency hopping for a channel according to an embodiment of the present invention. As shown in FIG. 6, the apparatus of determining frequency hopping for a channel includes:

a first determining unit 601, configured to determine a first bandwidth corresponding to a bandwidth part, where the first bandwidth corresponding to the bandwidth part is less than a second bandwidth corresponding to a system bandwidth;

a second determining unit 602, configured to determine, based on the first bandwidth corresponding to the bandwidth part, a frequency hopping step corresponding to an uplink channel; and a third determining unit 603, configured to determine, based on the frequency hopping step corresponding to the uplink channel, a frequency domain position used for transmitting the uplink channel.

Persons skilled in the art should understand that, functions implemented by units in the apparatus of determining frequency hopping for a channel shown in FIG. 6 may be understood by referring to the related description of the foregoing channel frequency hopping determining method. The functions of the units in the apparatus of determining frequency hopping for a channel shown in FIG. 6 may be implemented by using a program that is run in a processor, or may be implemented by using a specific logic circuit.

Figure 7:
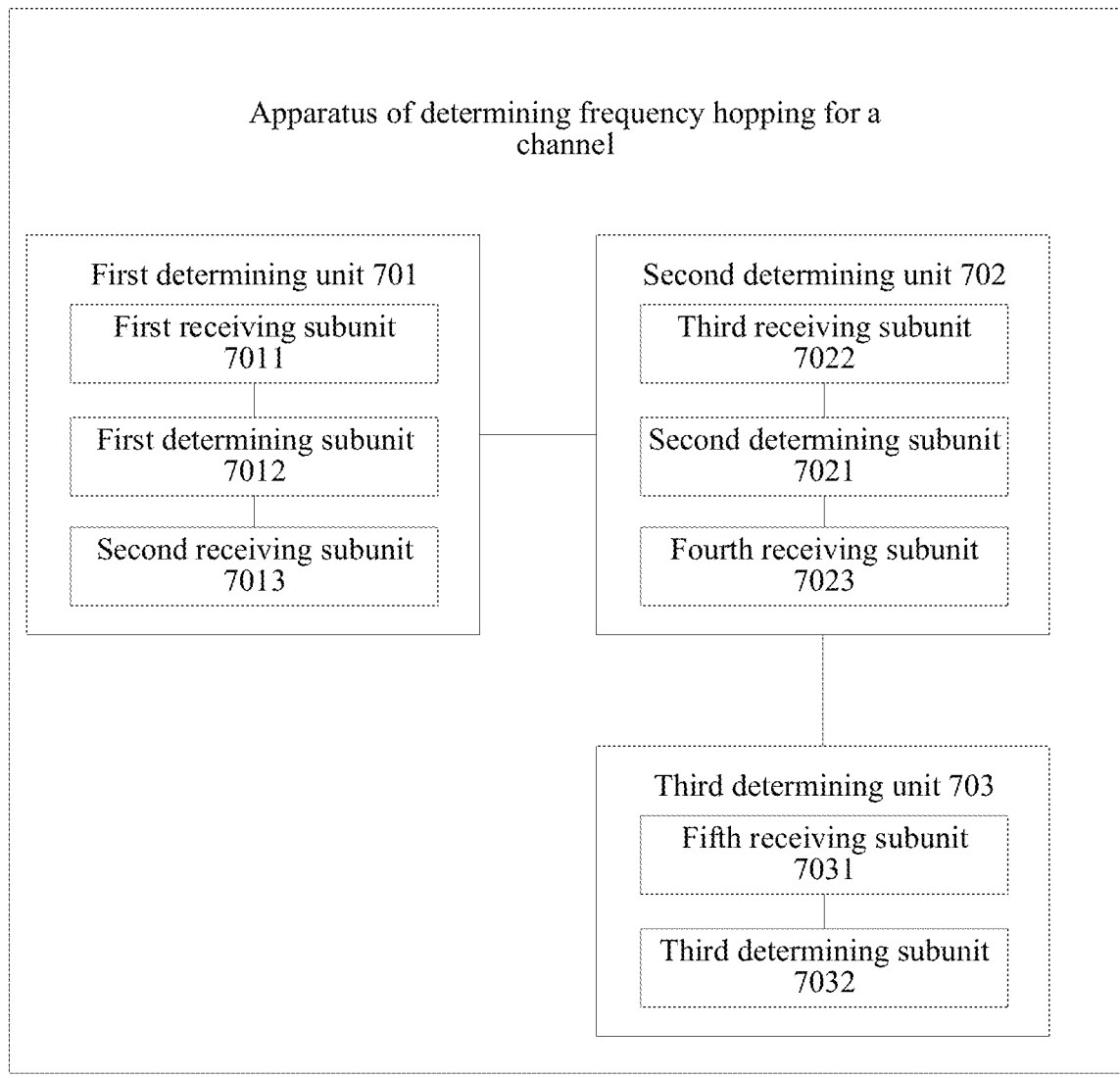
FIG. 7 is a schematic structural composition diagram 2 of an apparatus of determining frequency hopping for a channel according to an embodiment of the present invention.

FIG. 7 is a schematic structural composition diagram 2 of an apparatus of determining frequency hopping for a channel according to an embodiment of the present invention. As shown in FIG. 7, the apparatus of determining frequency hopping for a channel includes: a first determining unit 701, configured to determine a first bandwidth corresponding to a bandwidth part, where the first bandwidth corresponding to the bandwidth part is less than a second bandwidth corresponding to a system bandwidth; a second determining unit 702, configured to determine, based on the first bandwidth corresponding to the bandwidth part, a frequency hopping step corresponding to an uplink channel; and a third determining unit 703, configured to determine, based on the frequency hopping step corresponding to the uplink channel, a frequency domain position used for transmitting the uplink channel.

In an embodiment of the present invention, the first determining unit 701 includes: a first receiving subunit 7011, configured to receive first configuration information; and a first determining subunit 7012, configured to determine, based on the first configuration information, the first bandwidth corresponding to the bandwidth part.

In an embodiment of the present invention, the first receiving subunit 7011 is specifically configured to receive RRC signaling that carries the first configuration information; or receive system information carrying the first configuration information.

In an embodiment of the present invention, the first determining subunit 7012 is specifically configured to: determine, based on one piece of first configuration information when the one piece of first configuration information is received, the first bandwidth corresponding to the bandwidth part; determine, based on a plurality of pieces of first configuration information when the plurality of pieces of first configuration information is received, a plurality of candidate first bandwidths corresponding to the bandwidth part; and select, from the plurality of candidate first bandwidths, the first bandwidth corresponding to the bandwidth part.

In an embodiment of the present invention, the first determining unit 701 further includes: a second receiving subunit 7013, configured to receive first control signaling; and the first determining subunit 7012 is further configured to select, from the plurality of candidate first bandwidths based on the first control signaling, the first bandwidth corresponding to the bandwidth part.

In an embodiment of the present invention, the first control signaling is: DCI or a MAC CE.

In an embodiment of the present invention, the second determining unit 702 is specifically configured to determine, based on the following formula, the frequency hopping step corresponding to the uplink channel: $W_H = nW$, where $W_H$ is the frequency hopping step corresponding to the uplink channel, W is the first bandwidth corresponding to the bandwidth part, n is a proportionality coefficient, n=1/m, and m is a positive integer greater than 1.

When $W_H$ is determined based on the formula $W_H = nW$, $W_H = \lceil nW \rceil$ or $\lfloor nW \rfloor$, where $\lceil nW \rceil$ represents a minimum integer greater than nW, and $\lfloor nW \rfloor$ represents a maximum integer less than nW.

Considering that the frequency hopping step has an actual meaning only when being equal to an integer multiple of a frequency domain scheduling unit, in this embodiment of the present invention, a value of $W_H$ is an integer.

In an embodiment of the present invention, the second determining unit 702 includes: a second determining subunit 7021, configured to determine n or $W_H$ based on a preset value; or a third receiving subunit 7022, configured to receive second configuration information; and a second determining subunit 7021, configured to determine n or $W_H$ based on the second configuration information.

In an embodiment of the present invention, the third receiving subunit 7022 is specifically configured to receive RRC signaling that carries the second configuration information; or receive system information carrying the second configuration information.

In an embodiment of the present invention, the second configuration information and the first configuration information are same configuration information.

In an embodiment of the present invention, the second determining subunit 7021 is specifically configured to: determine n or $W_H$ based on one piece of second configuration information when the one piece of second configuration information is received; determine a plurality of candidate n or $W_H$ based on a plurality of pieces of second configuration information when the plurality of pieces of second configuration information is received; and select n or $W_H$ from the plurality of candidate n or $W_H$.

In an embodiment of the present invention, the second determining unit 702 further includes: a fourth receiving subunit 7023, configured to receive second control signaling; and the second determining subunit 7021 is further configured to select n or $W_H$ from the plurality of candidate n or $W_H$ based on the second control signaling.

In an embodiment of the present invention, the second control signaling is: DCI or a MAC CE.

In an embodiment of the present invention, the second control signaling and the first control signaling are same control signaling.

In an embodiment of the present invention, the third determining unit 703 is specifically configured to determine a frequency domain position of the second step of frequency hopping based on a frequency domain position of the first step of frequency hopping and the frequency hopping step corresponding to the uplink channel, where the frequency domain position of the first step of frequency hopping and the frequency domain position of the second step of frequency hopping are frequency domain positions used for transmitting the uplink channel.

In an embodiment of the present invention, the third determining unit 703 includes: a fifth receiving subunit 7031, configured to receive third control signaling; and a third determining subunit 7032, configured to determine the frequency domain position of the first step of frequency hopping based on the third control signaling.

In an embodiment of the present invention, the third control signaling is: DCI or a MAC CE.

In an embodiment of the present invention, the third control signaling and at least one of the following are same control signaling: the first control signaling and the second control signaling.

Persons skilled in the art should understand that, functions implemented by units in the apparatus of determining frequency hopping for a channel shown in FIG. 7 may be understood by referring to the related description of the foregoing channel frequency hopping determining method. The functions of the units in the apparatus of determining frequency hopping for a channel shown in FIG. 7 may be implemented by using a program that is run in a processor, or may be implemented by using a specific logic circuit.

If the foregoing apparatus of determining frequency hopping for a channel in the embodiments of the present invention is implemented in the form of a software function module and sold or used as an independent product, the apparatus of determining frequency hopping for a channel may be stored in a computer readable storage medium. Based on such an understanding, the technical solutions of the embodiments of the present invention essentially, or the part contributing to the existing technology may be embodied in a form of a software product. The computer software product is stored in a storage medium and includes several instructions for instructing a computer device (which may be a personal computer, a server, a network device, or the like) to perform all or a part of the methods of various embodiments of the present invention. The foregoing storage medium includes: any medium that can store program code, such as a USB flash drive, a removable hard disk, a read-only memory (ROM, Read Only Memory), a magnetic disk, or a compact disc. In this way, the embodiments of the present invention are not limited by any combination of specific hardware and software.

Correspondingly, an embodiment of the present invention further provides a computer storage medium, storing a computer executable instruction. The computer executable instruction is executed by a processor to implement the foregoing method of determining frequency hopping for a channel in the embodiments of the present invention.

Figure 8:
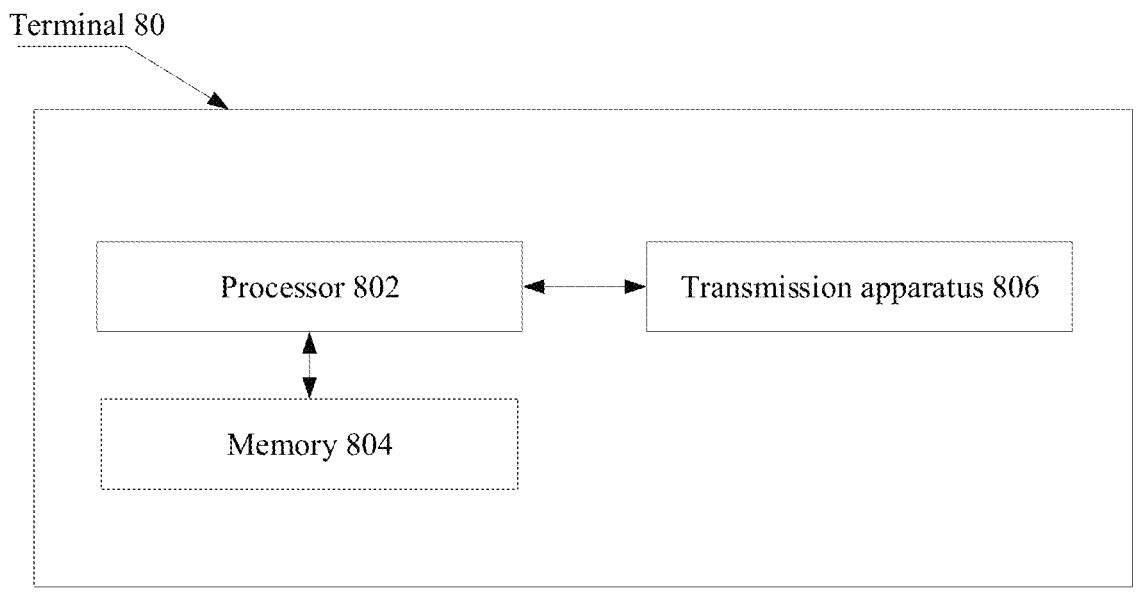
FIG. 8 is a schematic structural composition diagram of a terminal according to an embodiment of the present invention.

FIG. 8 is a schematic structural composition diagram of a terminal according to an embodiment of the present invention. As shown in FIG. 8, the terminal 80 may include one or more (where only one is shown in the figure) processors 802 (where the processor 802 may include but is not limited to processing apparatuses such as a microprocessor (MCU, Micro Controller Unit) and a programmable logical device (FPGA, Field Programmable Gate Array), a memory 804 configured to store data, and a transmission apparatus 806 used for a communications function. Persons skilled in the art may understand that, the structure shown in FIG. 8 is only schematic, and the structure does not constitute a limitation to the structure of the foregoing electronic apparatus. For example, the terminal 80 may further include more or fewer components than those shown in FIG. 8, or have a configuration different from that shown in FIG. 8.

The memory 804 may be configured to store a software program and a module of application software, for example, a program instruction/module corresponding to the method of determining frequency hopping for a channel in the embodiments of the present invention, and the processor 802 runs the software program and the module stored in the memory 804, to execute various function applications and data processing, that is, implement the foregoing method. The memory 804 may include a high-speed random memory, and may also include a nonvolatile memory such as one or more magnetic storage apparatuses, a flash memory, or another nonvolatile solid-state memory. In some embodiments, the memory 804 may further include memories remotely disposed relative to the processor 802, and these remote memories may be connected to the terminal 80 through a network. Examples of the network include, but are not limited to, the Internet, an intranet, a local area network, a mobile communications network, and a combination thereof.

The transmission apparatus 806 is configured to receive or send data through a network. A specific example of the network may include a wireless network provided by a communications operator of the terminal 80. In an example, the transmission apparatus 806 includes a network interface controller (NIC, Network Interface Controller) that may be connected to another network device by using a base station, thereby communicating with the Internet. In an example, the transmission apparatus 806 may be a radio frequency (RF, Radio Frequency) module that is configured to communicate with the Internet in a wireless manner.

Technical solutions set forth in the embodiments of the present invention may be in any combination when there is no conflict.

In the several embodiments provided in the present invention, it should be understood that the disclosed method and intelligent device may be implemented in other manners. The described device embodiments are merely exemplary. For example, the unit division is merely logical function division and may be other division during actual implementation. For example, a plurality of units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of the present invention may be all integrated in a second processing unit, each unit is separately used as a unit, or two or more units are integrated in a unit. The integrated unit may be implemented in a form of hardware, or may be implemented in form of hardware plus a software functional unit.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention.

What is claimed is:

1. A method of determining frequency hopping for a channel, the method comprising:
   determining, by a terminal, a first bandwidth corresponding to a bandwidth part, wherein the first bandwidth corresponding to the bandwidth part is less than a second bandwidth corresponding to a system bandwidth;
   determining, by the terminal based on the first bandwidth corresponding to the bandwidth part, a frequency hopping step corresponding to an uplink channel; and
   determining, by the terminal based on the frequency hopping step corresponding to the uplink channel, a frequency domain position used for transmitting the uplink channel,
   wherein determining, by the terminal based on the first bandwidth corresponding to the bandwidth part, the frequency hopping step corresponding to the uplink channel comprises:
   determining, by the terminal based on the following formula, the frequency hopping step corresponding to the uplink channel: $W_H = nW$, wherein
   $W_H$ is the frequency hopping step corresponding to the uplink channel,
   W is the first bandwidth corresponding to the bandwidth part,
   n is a proportionality coefficient,
   n=1/m, and
   m is a positive integer greater than 1.

2. The method of determining frequency hopping for a channel of claim 1, wherein determining, by a terminal, a first bandwidth corresponding to a bandwidth part comprises:
   receiving, by the terminal, first configuration information, and determining, based on the first configuration information, the first bandwidth corresponding to the bandwidth part.

3. The method of determining frequency hopping for a channel of claim 2, wherein receiving, by the terminal, first configuration information comprises:
   receiving, by the terminal, radio resource control RRC signaling that carries the first configuration information; or
   receiving, by the terminal, system information carrying the first configuration information.

4. The method of determining frequency hopping for a channel of claim 2, wherein receiving, by the terminal, first configuration information, and determining, based on the first configuration information, the first bandwidth corresponding to the bandwidth part comprises:
   determining, by the terminal based on one piece of first configuration information when receiving the one piece of first configuration information, the first bandwidth corresponding to the bandwidth part; and
   determining, by the terminal based on a plurality of pieces of first configuration information when receiving the plurality of pieces of first configuration information, a plurality of candidate first bandwidths corresponding to the bandwidth part; and selecting, from the plurality of candidate first bandwidths, the first bandwidth corresponding to the bandwidth part.

5. The method of determining frequency hopping for a channel of claim 1, wherein, when $W_H$ is determined based on a formula $W_H = nW$, $W_H = \lceil nW \rceil$ or $\lfloor nW \rfloor$, wherein $\lceil nW \rceil$ represents a minimum integer greater than nW, and $\lfloor nW \rfloor$ represents a maximum integer less than nW.

6. The method of determining frequency hopping for a channel of claim 1, further comprising:
   determining, by the terminal, n or $W_H$ based on a preset value; or receiving, by the terminal, second configuration information, and determining n or $W_H$ based on the second configuration information.

7. A computer system including:
one or more processors; and
one or more memories storing computer-readable instructions that, upon execution by the one or more processors, configure the computer system to:
  determine, by a terminal, a first bandwidth corresponding to a bandwidth part, wherein the first bandwidth corresponding to the bandwidth part is less than a second bandwidth corresponding to a system bandwidth;
  determine, by the terminal based on the first bandwidth corresponding to the bandwidth part, a frequency hopping step corresponding to an uplink channel; and
  determine, by the terminal based on the frequency hopping step corresponding to the uplink channel, a frequency domain position used for transmitting the uplink channel,
  wherein determining, by the terminal based on the first bandwidth corresponding to the bandwidth part, the frequency hopping step corresponding to the uplink channel comprises:
  determining, by the terminal based on the following formula, the frequency hopping step corresponding to the uplink channel: $W_H = nW$, wherein
  $W_H$ is the frequency hopping step corresponding to the uplink channel,
  W is the first bandwidth corresponding to the bandwidth part,
  n is a proportionality coefficient,
  n=1/m, and
  m is a positive integer greater than 1.

8. The computer system of claim 7, wherein determining, by a terminal, a first bandwidth corresponding to a bandwidth part comprises:
  receiving, by the terminal, first configuration information, and determining, based on the first configuration information, the first bandwidth corresponding to the bandwidth part.

9. The computer system of claim 8, wherein receiving, by the terminal, first configuration information comprises: receiving, by the terminal, radio resource control RRC signaling that carries the first configuration information; or receiving, by the terminal, system information carrying the first configuration information.

10. The computer system of claim 7, wherein, when $W_H$ is determined based on a formula $W_H = nW$, $W_H = \lceil nW \rceil$ or $\lfloor nW \rfloor$, wherein $\lceil nW \rceil$ represents a minimum integer greater than nW, and $\lfloor nW \rfloor$ represents a maximum integer less than nW.

11. The computer system of claim 10, wherein the computer-readable instructions further configure the computer system to:
  determine, by the terminal, n or $W_H$ based on a preset value; or
  receive, by the terminal, second configuration information, and determine n or $W_H$ based on the second configuration information.

* * * * *